(12) United States Patent
Kitakata et al.

(10) Patent No.: US 9,855,970 B2
(45) Date of Patent: Jan. 2, 2018

(54) VEHICLE FRONT STRUCTURE

(71) Applicant: TOYOTA JIDOSHA KABUSHIKI KAISHA, Toyota-shi (JP)

(72) Inventors: Shintaro Kitakata, Nissin (JP); Yasuyuki Hihara, Toyota (JP); Kenjiro Yamada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/915,803

(22) PCT Filed: Sep. 9, 2014

(86) PCT No.: PCT/IB2014/001769
§ 371 (c)(1),
(2) Date: Mar. 1, 2016

(87) PCT Pub. No.: WO2015/036831
PCT Pub. Date: Mar. 19, 2015

(65) Prior Publication Data
US 2016/0207573 A1    Jul. 21, 2016

(30) Foreign Application Priority Data

Sep. 11, 2013  (JP) .................................. 2013-188475

(51) Int. Cl.
*B62D 21/15*    (2006.01)
*B60R 21/34*    (2011.01)
(Continued)

(52) U.S. Cl.
CPC ............ *B62D 21/152* (2013.01); *B60R 19/12* (2013.01); *B60R 19/34* (2013.01); *B62D 25/082* (2013.01)

(58) Field of Classification Search
CPC .... B62D 21/152; B62D 25/082; B60R 19/12; B60R 19/34
(Continued)

(56) References Cited

U.S. PATENT DOCUMENTS 5,314,229 A     5/1994  Matuzawa et al.
7,267,394 B1 *  9/2007  Mouch ................. B62D 25/082
                                                296/187.09
(Continued)

FOREIGN PATENT DOCUMENTS

EP    0 546 352 A1    6/1993
EP    2 330 018 A1    6/2011
(Continued)

OTHER PUBLICATIONS

International Search Report dated Dec. 23, 2014 in PCT/IB2014/001769 filed on Sep. 9, 2014.

*Primary Examiner* — Joseph D Pape
*Assistant Examiner* — Dana Ivey
(74) *Attorney, Agent, or Firm* — Oblon, McClelland, Maier & Neustadt, L.L.P.

(57) ABSTRACT

A front side member 16 is arranged in a front part of a vehicle body 14 on an Outer side in a vehicle width direction along a vehicle front-rear direction, and an apron upper member 32 is further arranged on the outer side in the vehicle width direction and an upper side thereof. A gusset 28 is attached to an outer side of a front end of the front side member 16 in a projected manner. Furthermore, a front end of the apron upper member 32 is connected to the gusset 28 via an apron brace 34. A rear section 34A of the apron brace 34 is provided with a first lateral flange section 60C and a second lateral flange section 60D toward the vehicle width direction.

5 Claims, 10 Drawing Sheets

(51) Int. Cl.
  *B62D 25/08* (2006.01)
  *B60R 19/34* (2006.01)
  *B60R 19/12* (2006.01)

(58) Field of Classification Search
  USPC .................................................. 296/187.09
  See application file for complete search history.

(56) References Cited

U.S. PATENT DOCUMENTS

| | | | |
|---|---|---|---|
| 8,201,872 B2 * | 6/2012 | Baccouche | B62D 21/152 |
| | | | 296/187.09 |
| 2005/0077711 A1 | 4/2005 | Yasui et al. | |
| 2007/0176443 A1 | 8/2007 | Yasuhara et al. | |
| 2009/0140546 A1 | 6/2009 | Okabe et al. | |
| 2011/0148151 A1 | 6/2011 | Abe et al. | |
| 2012/0086225 A1 | 4/2012 | Matsuura et al. | |
| 2013/0207417 A1 | 8/2013 | Kihara et al. | |
| 2015/0069785 A1 | 3/2015 | Sakakibara et al. | |

FOREIGN PATENT DOCUMENTS

| | | |
|---|---|---|
| EP | 2 617 628 A1 | 7/2013 |
| JP | 3974567 B2 | 9/2007 |
| JP | 4617681 B2 | 1/2011 |
| JP | 2015-54589 A | 3/2015 |
| JP | 2015-54590 A | 3/2015 |

\* cited by examiner

F I G . 7A
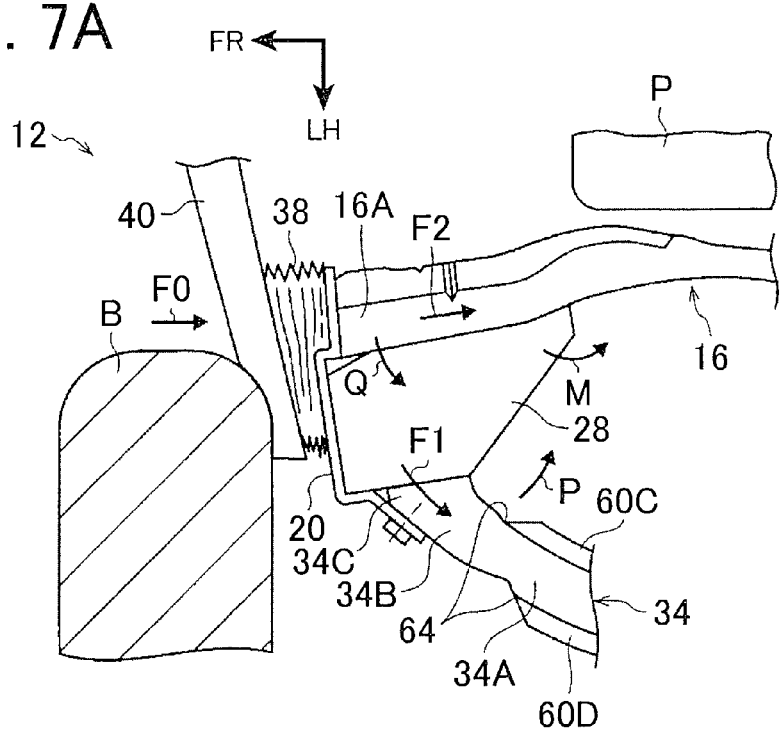
F I G . 7B
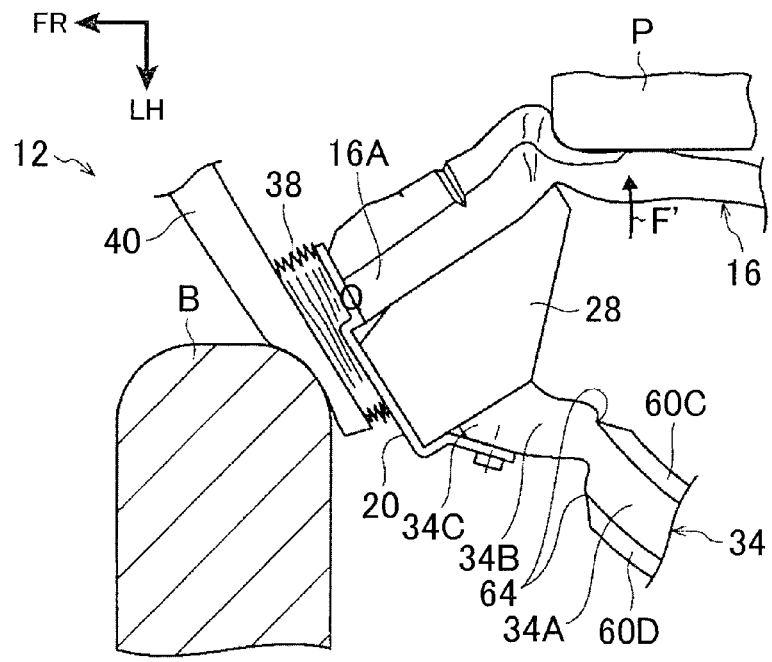

VEHICLE FRONT STRUCTURE

BACKGROUND OF THE INVENTION

1. Field of the Invention

The present invention relates to a vehicle front structure.

2. Description of Related Art

Japanese Patent Publication No. 3974567 below discloses a technique that relates to a front body structure of an automobile. In a brief description, this related art adopts a structure in which a gusset (a connecting member) is attached to a lateral surface at a front end of a front side member and a front end of an apron upper member (a left upper member) is further attached to an outer surface in a vehicle width direction of this gusset. In addition, the apron upper member is formed substantially in a linear shape in a plan view.

According to the above configuration, when a head-on collision (hereinafter referred to as a "short overlap collision") occurs in a mode that a collision load is applied to an outer side in the vehicle width direction of the front side member, the collision load at this time is applied to the apron upper member. However, since the apron upper member is formed substantially in the linear shape in this related art, the apron upper member is suppressed from being deformed, and the collision load can be received and dispersed by a front pillar.

In a case of the head-on collision such as the short overlap collision, a vehicle can move away from a collision body by generating a lateral force to an inner side in the vehicle width direction in the vehicle. However, in a vehicle front structure according to the above related art, it is configured to transmit and disperse the collision load to a rear side in the vehicle front-rear direction (in other words, the apron upper member is thrust in the vehicle front-rear direction by application of the collision load). Thus, there is room for improvement in a point that the lateral force to the inner side in the vehicle width direction is effectively generated in the vehicle. Furthermore, in the above related art, it is considered not to deform the apron upper member by the collision load. Thus, even if the apron upper member is deformed to the inner side in the vehicle width direction by the application of the collision load, a bending starting point thereof is unclear. Consequently, a mode of deformation may not be stabilized.

SUMMARY OF THE INVENTION

The present invention provides a vehicle front structure that can effectively generate a lateral force to an inner side in a vehicle width direction in a vehicle during a head-on collision such as a short overlap collision.

The vehicle front structure according to one aspect of the present invention includes: a front side member that is arranged on an outer side in a vehicle width direction with respect to a front part of a vehicle body, the front side member extending along a vehicle front-rear direction; an apron upper member that is arranged on the outer side in the vehicle width direction with respect to the front side member, the apron upper member arranged upward in the vehicle up and down direction with respect to the front side member, the apron upper member extending along the vehicle front-rear direction, the apron upper member including a front end of the apron upper member, the front end of the apron upper member being joined to a front end side of the front side member and the outer side of the front side member in the vehicle width direction either directly or via a member; and a fragile section provided on the front end side of the apron upper member, the fragile section serving as a bending starting point, the front end side of the apron upper member being deformed to an inner side in the vehicle width direction at the bending starting point when a collision load is applied.

In the vehicle front structure, the front end of the apron upper member is joined to the front end side of the front side member and the outer side of the front side member in the vehicle width direction either directly or via the member. Accordingly, during the head-on collision (such as the short overlap collision or an oblique collision) that is a collision mode with a small overlapping amount in the vehicle width direction with a collision body, a collision load is applied to the front end of the front side member and the front end of the apron upper member.

Here, in the one aspect of the present invention, the fragile section is provided on the front end side of the apron upper member. When the collision load is applied, the apron upper member is bent and deformed with the fragile section being an starting point, and the front end side of the apron upper member is deformed to the inner side in the vehicle width direction. Accordingly, a deformation mode of the apron upper member is stabilized. Here, when the front end side of the apron upper member is bent and deformed to the inner side in the vehicle width direction, moment that causes the front side member to be bent to the inner side in the vehicle width direction (so-called inward projection and bending) is applied to the front side member. Consequently, the front side member is projected and bent inward and abuts against a vehicle component (for example, a power unit or the like). Thus, a lateral force to the inner side in the vehicle width direction can be generated in the vehicle.

As described above, the vehicle front structure exhibits a superior effect that the lateral force to the inner side in the vehicle width direction can effectively be generated in the vehicle during the head-on collision such as the short overlap collision.

In the vehicle front structure, the apron upper member may include a closed cross-section structure and the apron upper member may be formed with a pair of flange sections on an outer periphery of the apron upper member, the pair of flange sections are projected in a direction to separate from each other. Furthermore, a planar direction of the flange section may be changed in a surface of the flange section, and the fragile section may be a portion that the planar direction of the flange section is changed.

In the vehicle front structure, the pair of flange sections that are projected in the direction to separate from each other is formed on the outer periphery of the apron upper member with the closed cross-section structure. In the present invention, the planar direction of the flange section is changed in the surface of the flange section. Thus, a cross-sectional shape of the apron upper member is changed in a portion that the planar direction of the flange section is changed, and the portion is the fragile section. Accordingly, when a method of constituting the fragile section by changing the planar direction of the flange section is adopted, just as described, the number of components is not increased.

The vehicle front structure exhibits a superior effect that stabilization of the bending mode of the apron upper member can be realized without increasing the weight and cost.

In the vehicle front structure, the fragile section may be a portion that a cross-sectional shape of the apron upper member is changed, the cross-sectional shape of the apron upper member being formed by cutting by a plane that is orthogonal to a longitudinal direction of the apron upper member.

In the vehicle front structure, the portion that the cross-sectional shape of the apron upper member is changed being formed by cutting by the plane that is orthogonal to the longitudinal direction of the apron upper member, is set in the apron upper member, and the portion serves as the fragile section. Thus, the number of components is not increased.

The vehicle front structure exhibits the superior effect that the stabilization of the bending mode of the apron upper member can be realized without increasing the weight and cost.

In the vehicle front structure, the apron upper member may include the portion that the planar direction the flange section is changed and the apron upper member may include the portion that the cross-sectional shape is changed.

In the vehicle front structure, the apron upper member includes the fragile section served by the portion that the planar direction the flange section is changed and the apron upper member includes the fragile section served by the portion that the cross-sectional shape is changed. Thus, the apron upper member is further reliably bent and deformed. Therefore, the bending mode of the apron upper member is further stabilized.

The vehicle front structure exhibits a superior effect that the lateral force to the inner side in the vehicle width direction can further effectively be generated in the vehicle during the head-on collision such as the short overlap collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7A is a plan view that schematically shows an operation in the vehicle front structure according to this embodiment at a different time point during the short overlap collision;

FIG. 7B is a plan view that schematically shows an operation in the vehicle front structure according to this embodiment at another different time point during the short overlap collision;

DETAILED DESCRIPTION OF EMBODIMENTS

Figure 1:
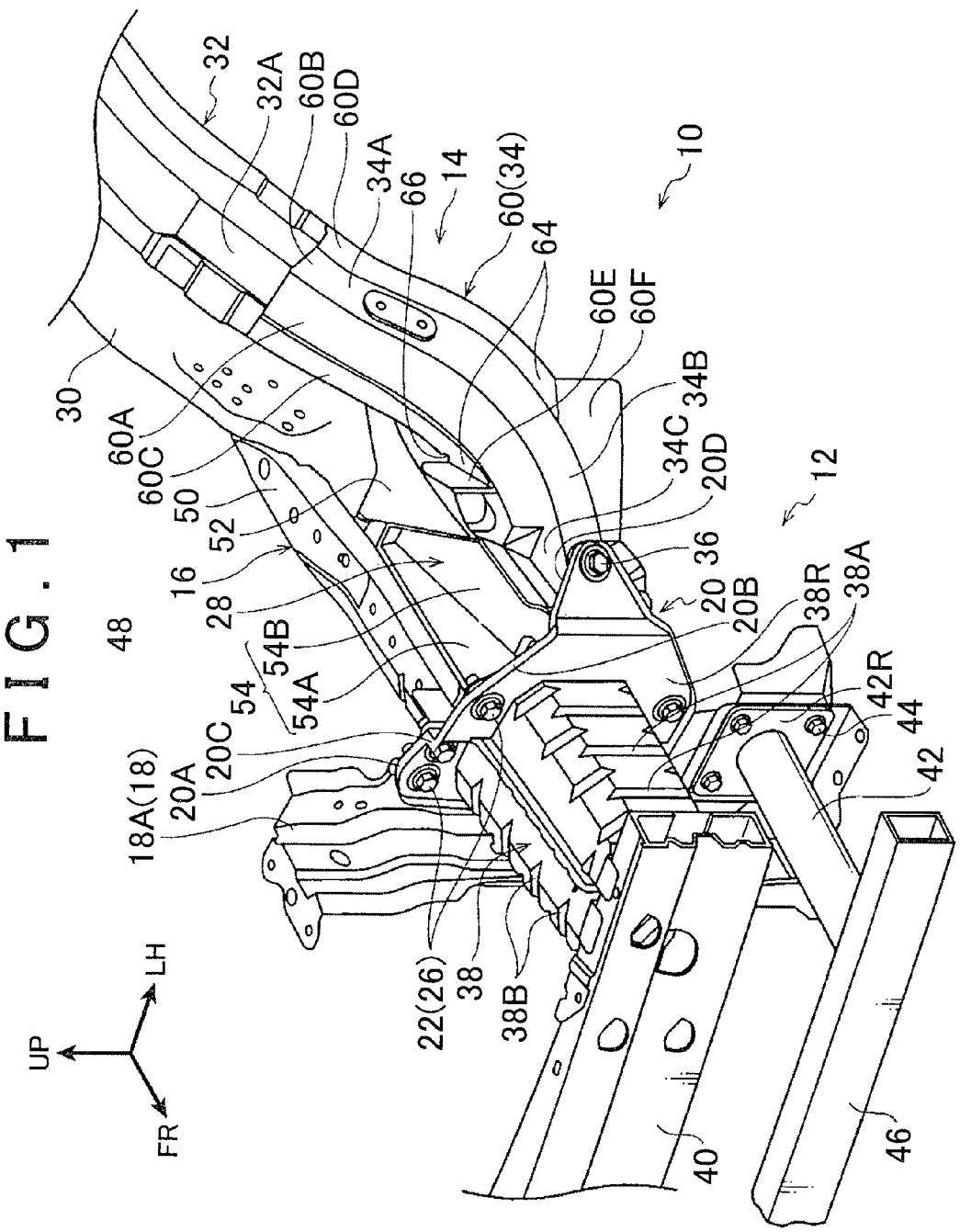
FIG. 1 is a perspective view in which a main section of a vehicle front structure according to this embodiment is enlarged.

A description will hereinafter be made on a vehicle front structure 10 according to embodiments of the present invention on the basis of FIG. 1 to FIG. 10. It should be noted that an arrow FR, an arrow UP, an arrow LH that are appropriately depicted in the drawings respectively indicate a front direction in a vehicle front-rear direction, an upper direction in a vehicle up and down direction, and a left direction side when facing the front direction. When a longitudinal direction, a up and down direction, and a right and left direction are used in the following description without any particular instruction, the longitudinal direction, the up and down direction and the right and left direction respectively indicate front and rear in the vehicle front-rear direction, up and down in the vehicle up and down direction, and right and left in a traveling direction.

Configuration of the Vehicle Front Structure

<Front Side Member 16>

As shown in FIG. 1, a right and left pair of front side members 16 is disposed on both sides in a vehicle width direction of a vehicle body 14 in a vehicle (an automobile) 12 to which the vehicle front structure according to the present invention is applied. Here, a left side of the vehicle front structure 10 in the vehicle is shown. The front side members 16 are longitudinal in the vehicle front-rear direction (arranged along the vehicle front-rear direction) and arranged in parallel and arranged apart in the vehicle width direction. A radiator support 18 is attached between front parts of the right and left front side members 16. Although not shown, the radiator support 18 is configured to include a portion in a rectangular frame shape in a front view of the vehicle since an upper member (a radiator support upper) and a lower member (a radiator support lower) that oppose each other in up and down direction are coupled at both ends in the vehicle width direction by a right and left pair of side members (up and down columns) 18A.

Figure 5A:
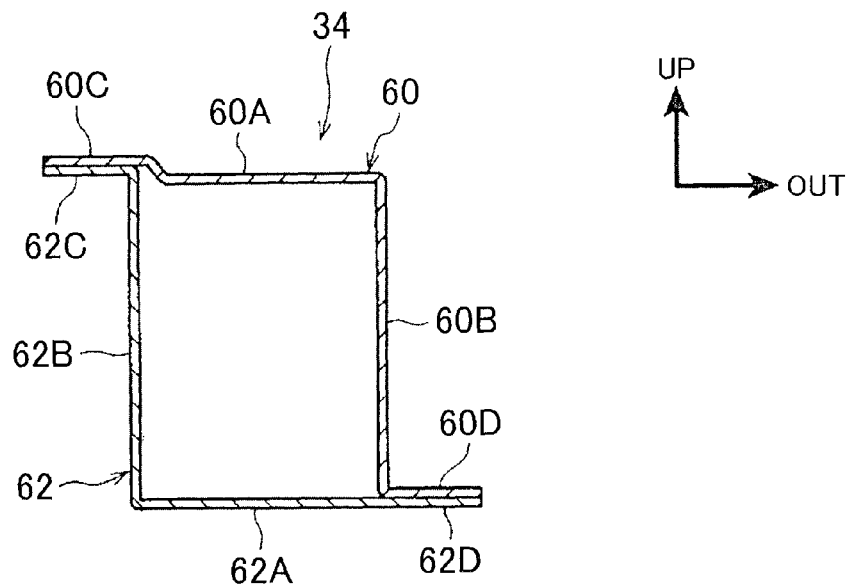
FIG. 5A is a up and down cross-sectional view that is taken along the line 5A-5A in FIG. 2.
Figure 5B:
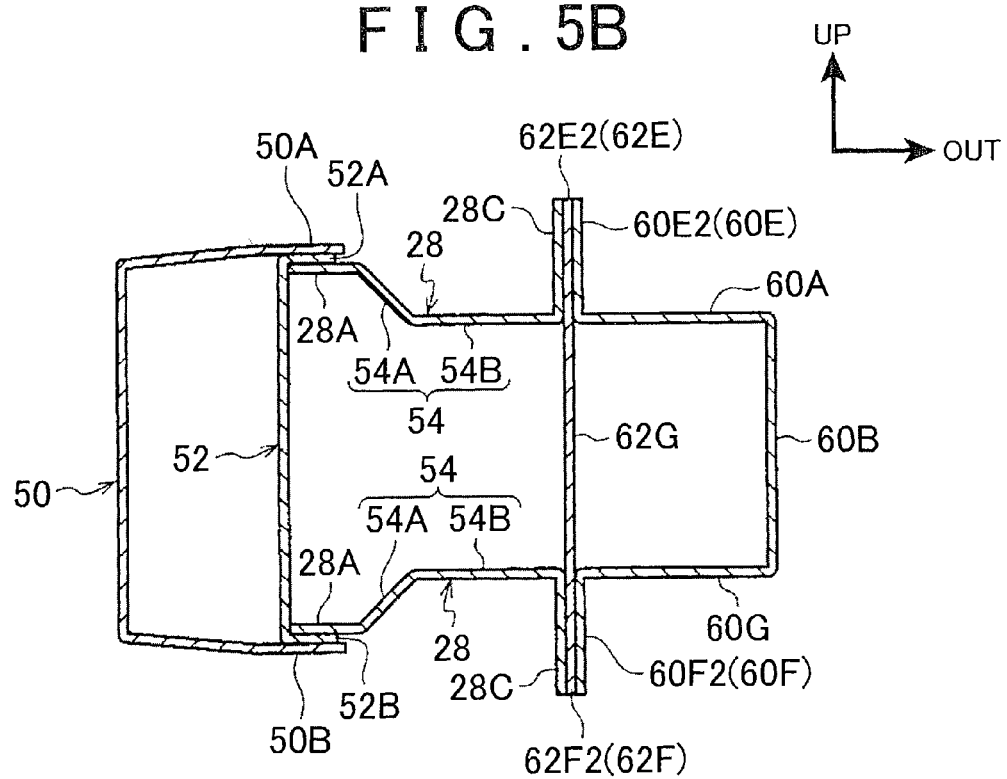
FIG. 5B is a up and down cross-sectional view that is taken along the line 5B-5B in FIG. 2.

As shown in FIG. 1 and FIG. 5B, the front side member 16 is configured to include a front side member inner 50 whose cross section is substantially U-shaped when cutting the front side member inner 50 by a plane that is orthogonal to the longitudinal direction of the front side member inner 50 and to include a front side member outer 52 that is formed substantially plate shaped and closes an opening side of the front side member inner 50. An upper flange 50A is integrally formed on the outer side in the vehicle width direction with respect to an upper wall section of the front side member inner 50, and similarly, a lower flange 50B is integrally formed on the outer side in the vehicle width direction with respect to a lower wall section of the front side member inner 50. Meanwhile, an upper end of the front side member outer 52 is bent to the outer side in the vehicle width direction and is set as an upper flange 52A, and similarly, a lower end of the front side member outer 52 is bent to the outer side in the vehicle width direction and is set as a lower flange 52B. Then, both of the upper flanges 50A, 52A are coupled to each other by spot welding or the like, and both of the lower flanges 50B, 52B are coupled to each other by spot welding or the like. Accordingly, the front side member 16 is formed to have a closed cross-section structure.

Figure 2:
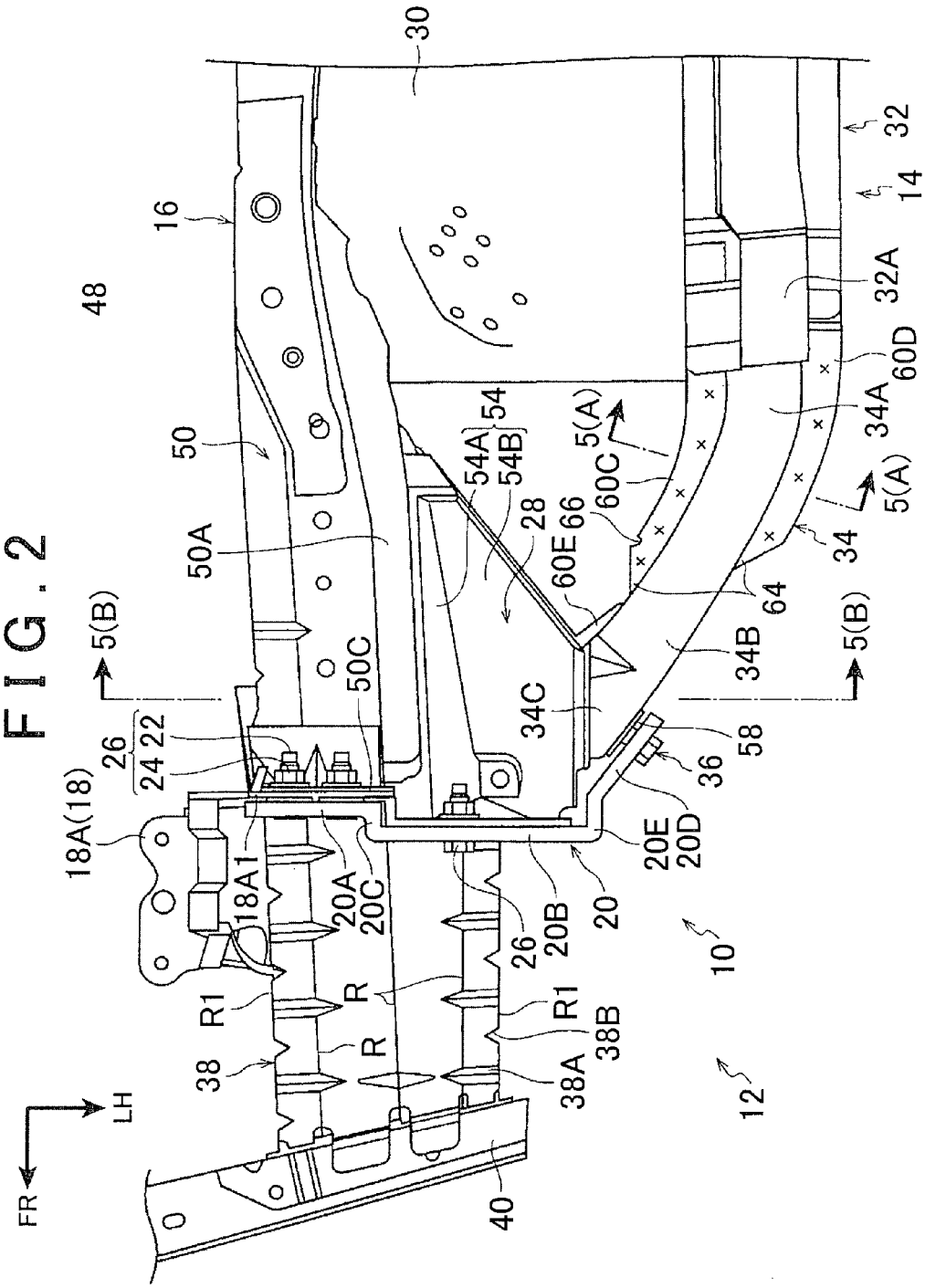
FIG. 2 is a plan view in which the main section of the vehicle front structure according to this embodiment is enlarged.

In addition, as shown in FIG. 2, a front flange 50C that is bent to a vehicle upper side is provided at a front end of the front side member inner 50, and a plate-shaped bracket 20, which will be described below, is fastened and coupled to the front flange 50C by a fastener 26 that includes a bolt 22 and a weld nut 24. A flange 18A1 (see FIG. 2) of the side member 18A of the radiator support 18 is co-fastened in a state of being held between the bracket 20 and the front flange 50C.

<Gusset 28>

As shown in FIG. 1, FIG. 2, FIG. 4, and FIG. 5B, on the outer side in the vehicle width direction of the front part (a front end side) with respect to the front side member 16 described above, gussets 28, each of which is a member having a polygonal shape (a substantially trapezoidal shape) in a plan view, are provided in up and down direction in two stages. Here, since the gusset 28 that is arranged in a lower stage roughly matches the gusset 28 that is arranged in an upper stage when the gusset 28 in the upper stage is turned upside down. Accordingly, the gusset 28 that is arranged in the lower stage is denoted by the same reference numeral as the gusset 28 that is arranged in the upper side, and a description thereof will not be made.

Figure 4:
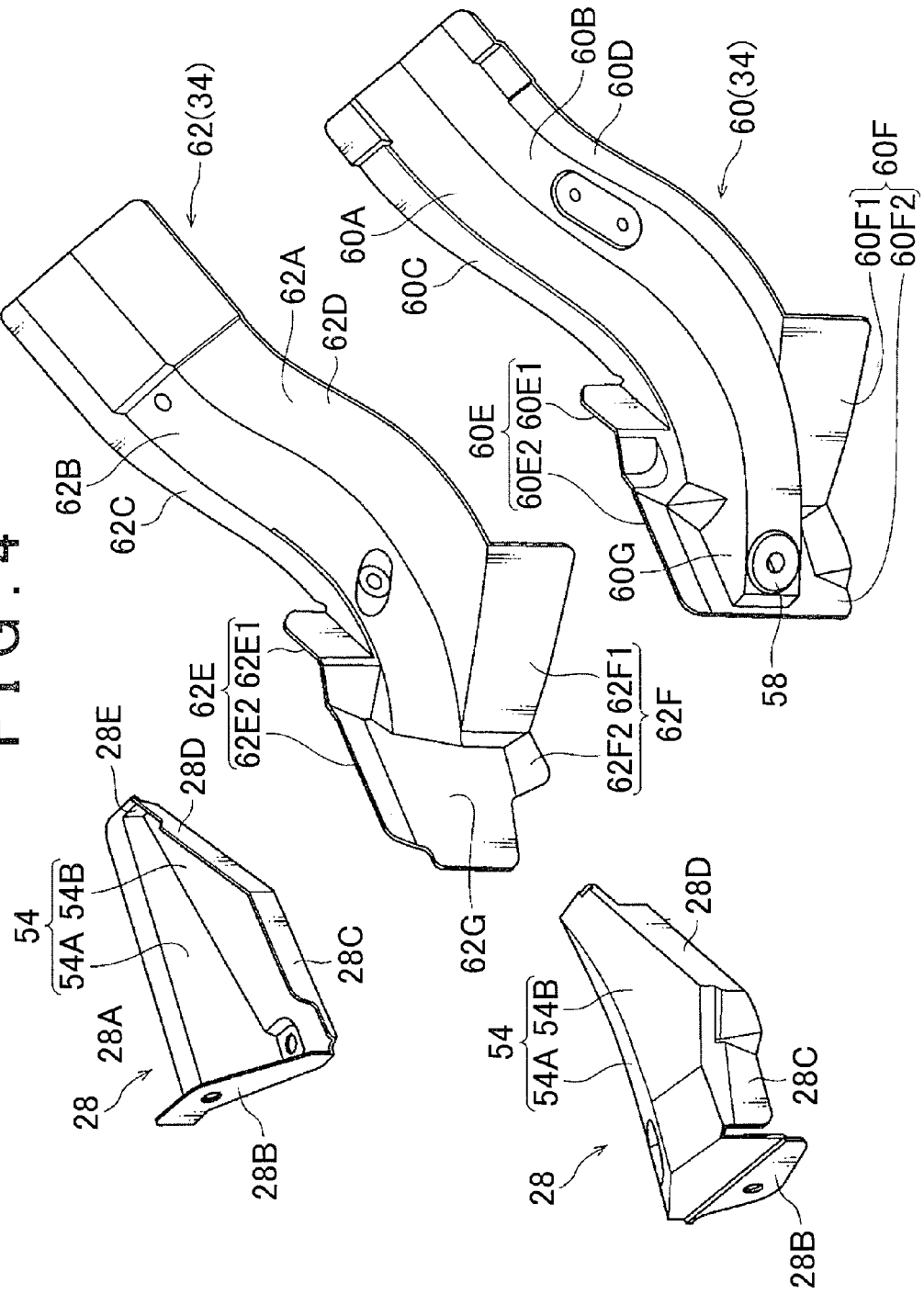
FIG. 4 is a side view in which a portion of the main section of the vehicle front structure according to this embodiment is exploded.

As shown in FIG. 4, the gusset 28 that is arranged in the upper stage includes a base section 54 that is configured to include two surfaces of an inclined section 54A and a bottom section 54B. The inclined section 54A is in a substantially right triangle shape that is inclined toward a downward in the vehicle up and down direction as the inclined section 54A extends from the inner side to the outer side in the vehicle width direction, and the bottom section 54B extends substantially laterally to the outer side in the vehicle width direction from a hypotenuse of the inclined section 54A. The gusset 28 has a substantially trapezoidal shape in the plan view. A flange is integrally formed in a peripheral edge of this base section 54. More specifically, an upper end of the inclined section 54A is bent to the inner side in the vehicle width direction and is set as an inner flange section 28A of the gusset 28. In addition, a front end of the base section 54 and a front end of the inner flange section 28A are bent to the vehicle upper side and are set as a front flange section 28B of the gusset 28. Furthermore, an end on the outer side of the bottom section 54B in the vehicle width direction is bent to the vehicle upper side and is set as an outer flange section 28C of the gusset 28 and an inclined flange section 28D of the gusset 28. Moreover, a rear end of the base section 54 is bent to the vehicle upper side and is set as a rear flange section 28E of the gusset 28.

The inner flange section 28A of the gusset 28 that is arranged in the upper stage is arranged on a lower side of the upper flange 52A of the front side member outer 52, and the inner flange section 28A of the gusset 28 that is arranged in the lower-stage is arranged on an upper side of the lower flange 52B of the front side member outer 52. Then, the inner flange section 28A and the upper flanges 50A, 52A on the upper stage side are spot welded, and the inner flange section 28A and the lower flanges 50B, 52B on the lower stage side are spot welded. Accordingly, the gussets 28 in the upper and lower stages are integrated with a surface on the outer side of the front side member 16 in the vehicle width direction. In addition, the front flange section 28B of the gusset 28 is fastened and coupled to the bracket 20 by the fastener 26 that includes the bolt 22 (see FIG. 1) and the weld nut 24.

<Fender Apron 30>

As shown in FIG. 1, a fender apron 30 is provided on the outer side in the vehicle width direction with respect to the each front side member 16 (the one on the vehicle left side is only shown), and a lower end of the each fender apron 30 on the inner side in the vehicle width direction is coupled to the front side member 16. Meanwhile, an upper end of the fender apron 30 on the outer side in the vehicle width direction is coupled to an apron upper member 32 that is longitudinal in the vehicle front-rear direction.

<Apron Upper Member 32>

The apron upper member 32 is arranged on the outer side in the vehicle width direction and on the upper side with respect to the front side member 16 and the apron upper member 32 extends along the vehicle front-rear direction. This apron upper member 32 is configured to have a substantially L-shaped cross section that is cut along an orthogonal direction to the longitudinal direction and the apron upper member 32 is configured to be divided in the vehicle up and down direction into an apron upper member inner 32A and an apron upper member outer. Since these members are coupled to each other by the spot welding or the like, the apron upper member 32 has a closed cross-section structure.

A rear end of the apron upper member 32 is coupled to a front pillar, which is not shown. In addition, the apron upper member 32 is inclined to the lower side as the apron upper member 32 extends toward the front side in a side view, and a bottom wall of the apron upper member 32 is curved in a substantially arcuate shape that is opened on the lower side. A front end of the apron upper member 32 is provided with an apron brace 34 that is continuous with the apron upper member 32, is inclined to the lower side as the apron brace 34 extends toward the front side in the side view, and is longitudinal in the vehicle front-rear direction. It should be noted that the apron brace 34 is a member that constitutes a portion of the "apron upper member" in the present invention, and the "apron upper member" in the present invention is configured to include the apron upper member 32 and the apron brace 34.

In the further description of the bracket 20, the front flange section 28B of the gusset 28 is arranged to be positioned on a vehicle front side with respect to the front flange 50C of the front side member inner 50. Accordingly, a step section 20C is provided in the bracket 20 between a coupling section 20A to which the front flange 50C of the front side member inner 50 is coupled and a coupling section 20B to which the front flange section 28B of the gusset 28 is coupled. The coupling section 20A and the coupling section 20B are offset in the vehicle front-rear direction by this step section 20C in the plan view, and the coupling section 20B is arranged to the front side with respect to the coupling section 20A.

An inclined piece 20D extends to the outer side in the vehicle width direction as the inclined piece 20D extends toward the rear side, the inclined piece 20D extends from the coupling section 20B. The inclined piece 20D is formed to be substantially orthogonal to the inclined flange section 28D, which constitutes a portion of the gusset 28, in the plan view. A step section 20E that extends toward the rear side is provided between the coupling section 20B and the inclined flange section 28D, and the step section 20E is set to have a slightly larger offset amount than the step section 20C. In other words, a front end of the inclined piece 20D is arranged on the rear side with respect to the coupling section 20A. In addition, the inclined piece 20D is fastened to a bolt fastening section 58 via a fastener 36, the bolt fastening section 58 being formed at a front end of an outer side wall section 60B of an apron brace outer 60, which will be described below.

<Crush Box 38 and the Like>

Meanwhile, as shown in FIG. 2, a crush box 38 is disposed at the bracket 20 and is disposed on the front side of the front side member 16 and is disposed on the front side of the gusset 28. A rear flange 38R is provided at a rear end of the crush box 38 in an integral manner with the crush box 38. The rear flange 38R and the bracket 20 are fastened and coupled to the front flange 50C of the front side member inner 50 and the front flange section 28B of the gusset 28 in a state of being co-fastened by the fastener 26.

The crush box 38 that is attached to the bracket 20 has a substantially square tube shape that is longitudinal in the vehicle front-rear direction, and is formed with a plurality of ridge lines R along the vehicle front-rear direction. In the crush box 38, a plurality of concave sections 38A, 38B is formed across the ridge lines R along the orthogonal direction to the vehicle front-rear direction. The concave portion 38A and the concave portion 38B are arranged at a ridge line R1 that is located on the inner side in the vehicle width direction and at a ridge line R1 that is located the outer side in the vehicle width direction, the concave section 38A and the concave section 38B are alternately arranged at a ridge line R1 with a specified pitch being provided therebetween.

In addition, a bumper reinforcement 40 that is longitudinal in the vehicle width direction is coupled to a front end of the crush box 38. In other words, the bumper reinforcement 40 connects front end of the right crush box 38 with front ends of the left crush box 38.

Meanwhile, as shown in FIG. 1, a flange 42R that is provided at a rear end of a pipe member 42 is fastened and coupled to a lower portion of the front flange 50C of the front side member inner 50 by a fastener 44, the pipe member 42 being disposed along the vehicle front-rear direction. A lower side bumper reinforcement 46 that is located below the bumper reinforcement 40 connects front ends of the right pipe members 42 with front ends of the left pipe members 42.

In addition, as shown in FIG. 6A, in an engine compartment 48, a power unit P that is a drive source of the vehicle 12 is arranged between the right and left front side members 16. The power unit P is directly or indirectly supported by components of the vehicle body 14 such as the right and left front side members 16 and a suspension member (not shown).

<Apron Brace 34>

Here, a detailed description will be made on a structure of the apron brace 34 that connects the front end 32A of the apron upper member 32 to the gusset 28.

As shown in FIG. 1 to FIGS. 5A, 5B (particularly, FIG. 4), in terms of a shape, the apron brace 34 is configured to include: a rear section 34A that extends from the front end 32A of the apron upper member 32 to the vehicle front side and a vehicle lower side in a convex curved shape; and a front section 34B that further extends from the rear section 34A to the vehicle front side and the inner side in the vehicle width direction in a concave curved shape. It should be noted that a front end of the front section 34B may be referred to as a "front end 34C" in the following description upon necessity. In addition, in terms of the structure, the apron brace 34 is configured to include the apron brace outer 60 that is arranged on the outer side in the vehicle width direction and is configured to include an apron brace inner 62 that is arranged on the inner side in the vehicle width direction with respect to this apron brace outer 60.

In detail, the apron brace outer 60 is configured to include a top wall section 60A that constitutes an upper surface of the brace and is configured to include the outer side wall section 60B that extends in a right angle direction from an end of this top wall section 60A on the outer side in the vehicle width direction. The apron brace outer 60 as a whole is formed to have a substantially L-shaped cross section. The apron brace inner 62 is configured to include a bottom wall section 62A that constitutes a lower surface of the brace and is configured to include an inner side wall section 62B that is bent in the right angle direction to the vehicle upper side from an end of this bottom wall section 62A on the inner side in the vehicle width direction. The apron brace inner 62 as a whole is formed to have a substantially L-shaped cross section.

A planar direction of the flange section of the rear section 34A differs from a planer direction of the flange section of the front section 34B in the apron brace 34, and this point is a characteristic of this embodiment.

In detail, the rear section 34A side of the apron brace outer 60 is formed with a first lateral flange section 60C that extends from an end of the top wall section 60A on the inner side in the vehicle width direction to the inner side in the vehicle width direction and a second lateral flange section 60D that is bent from a lower end of the outer side wall section 60B to the outer side in the vehicle width direction. In addition, the front section 34B side of the apron brace outer 60 is formed with a first up and down flange section 60E that is bent from the end of the top wall section 60A on the inner side in the vehicle width direction to the vehicle upper side and a the second up and down flange 60F that is bent from the lower end of the outer side wall section 60B to the vehicle lower side. A rear portion of the first up and down flange section 60E is formed in a mountain shape in the plan view and set as a rear flange section 60E1, and a front portion of the first up and down flange section 60E is bent from a front end of the rear flange section 60E1 to the vehicle front side and set as a front flange section 60E2. In addition, a rear portion of the second up and down flange section 60F is formed in a linear shape in a bottom view and set as a rear flange section 60F1, and a front portion of the second up and down flange section 60F extends from a front end of the rear flange section 60F1 to the vehicle front side and set as a front flange section 60F2. Then, a front end portion 60G of the apron brace outer 60 is arranged between the front flange section 60E2 in upper side and the front flange sections 60F2 in lower side, a concave portion of the front end portion 60G is opened to the inner side in the vehicle width direction. The bolt fastening section 58 is provided in this front end portion 60G by including an bolt insertion hole and a weld nut (not shown) that is welded to the bolt fastening section 58.

Meanwhile, the rear section 34A side of the apron brace inner 62 is formed with a first lateral flange section 62C that is bent from the upper end of the inner side wall section 62B to the inner side in the vehicle width direction and a second lateral flange section 62D that extends from an end of the bottom wall section 62A on the outer side in the vehicle width direction to the outer side in the vehicle width direction. In addition, the front section 34B side of the apron brace inner 62 is formed with a first up and down flange section 62E that extends from the upper end of the inner side wall section 62B to the vehicle upper side and a second up and down flange section 62F that is bent from the end of the bottom wall section 62A on the outer side in the vehicle width direction to the vehicle lower side. A rear portion of the first up and down flange section 62E is formed in a mountain shape in the plan view and set as a rear flange section 62E1, and a front portion of the first up and down flange section 62E is bent from a front end of the rear flange section 62E1 to the vehicle front side and set as a front flange section 62E2. In addition, a rear portion of the second up and down flange section 62F is formed in a linear shape in the bottom view and set as a rear flange section 62F1, and a front portion of the second up and down flange section 62F extends from a front end of the rear flange section 62F1 to the vehicle front side and set as a front flange section 62F2. Then, a front end portion 62G of the apron brace inner 62 is arranged between the front flange section 62E2 in upper side and the front flange section 62F2 in lower side, so as to close the concave portion of the front end portion 60G of the apron brace outer 60.

The first lateral flange section 60C of the apron brace outer 60 and the first lateral flange section 62C of the apron brace inner 62 overlap with each other and are joined by the spot welding, the second lateral flange section 60D of the apron brace outer 60 and the second lateral flange section 62D of the apron brace inner 62 overlap with each other and are joined by the spot welding, the first up and down flange section 60E of the apron brace outer 60 and the first up and down flange section 62E of the apron brace inner 62 overlap with each other and are joined by the spot welding, the second up and down flange section 60F of the apron brace outer 60 and the second up and down flange section 62F of the apron brace inner 62 overlap with each other and are joined by the spot welding. Accordingly, the apron brace 34 is configured to have the closed cross-section structure.

Figure 3:
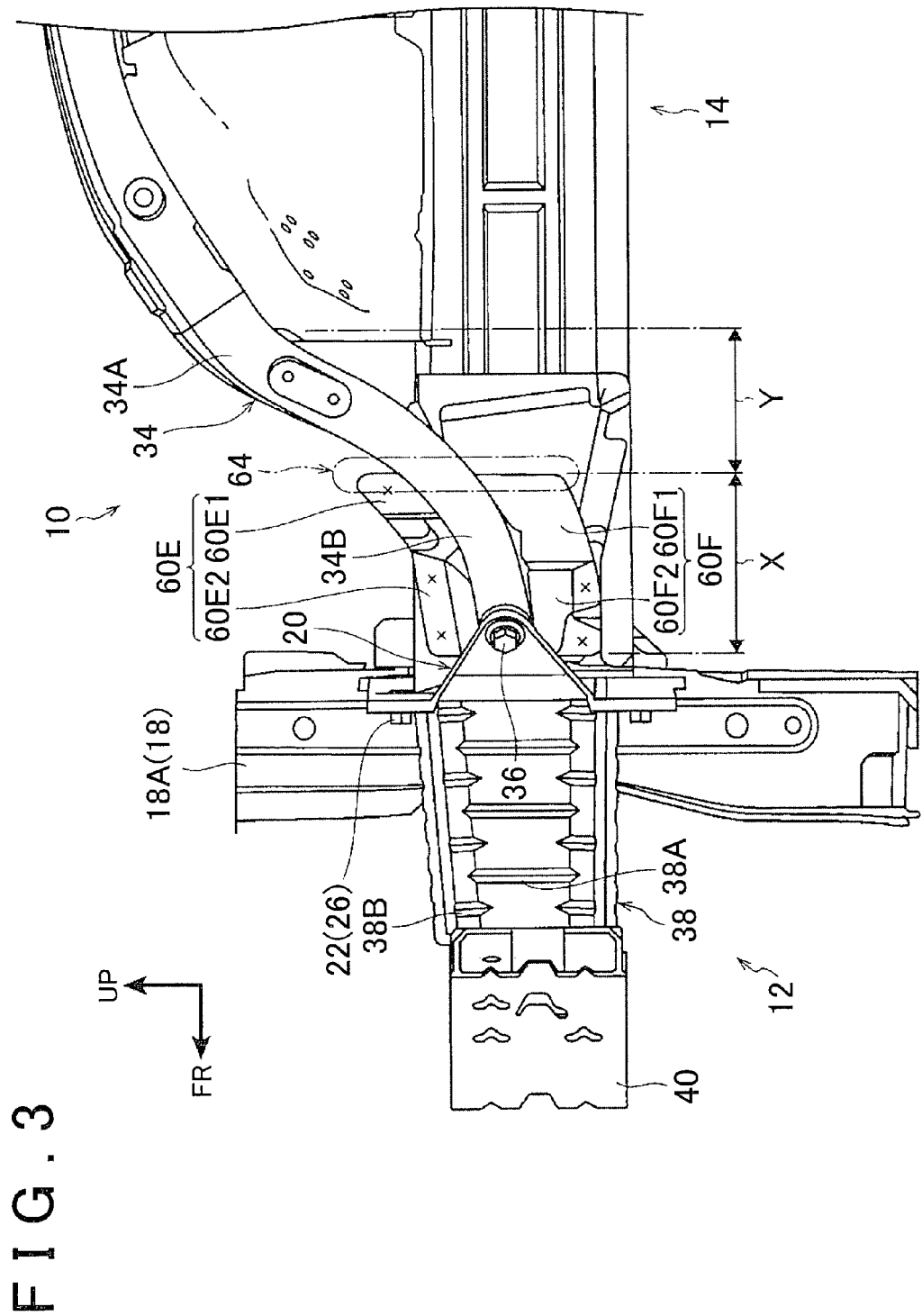
FIG. 3 is a side view in which the main section of the vehicle front structure according to this embodiment is enlarged.

The above-described apron brace 34 is formed with a range X in which planer direction of the flange faces to the vehicle width direction (see FIG. 3) and a range Y in which planer direction of the flange faces to the vehicle up and down direction (see FIG. 3). Then, a boundary between the range X and the range Y constitutes a fragile section 64 in which the planar direction of the flange is changed. In this embodiment, portions that are adjacent to the rear flange sections 60E1, 62E1 are each formed with a notch 66, and this notch 66 also contributes to improvement in a fragile effect (a bending starting point effect) of the fragile section 64.

In the above configuration, a combination of the first lateral flange section 60C and the second lateral flange section 60D, a combination of the first up and down flange section 60E and the second up and down flange section 60F, a combination of the first lateral flange section 62C and the second lateral flange section 62D, and a combination of the first up and down flange section 62E and the second up and down flange section 62F each constitutes "the pair of flange sections" in the present invention.

Operation and Effects of the Vehicle Front Structure

Next, an operation and effects of this embodiment will be described by using FIG. 6 to FIG. 9. The following description will be made on, the operations in a case where a mode of a collision occurs in which a collision body mainly collides with the left side as one side in the vehicle width direction of the vehicle 12, to which the vehicle front structure 10 configured as above is applied. As such a mode of the collision, the short overlap collision or an oblique collision can be raised.

Here, of a head-on collision of the vehicle, a collision with the outer side in the vehicle width direction of the front side member as a vehicle body frame corresponds to the short overlap collision, for example.

Figure 8:
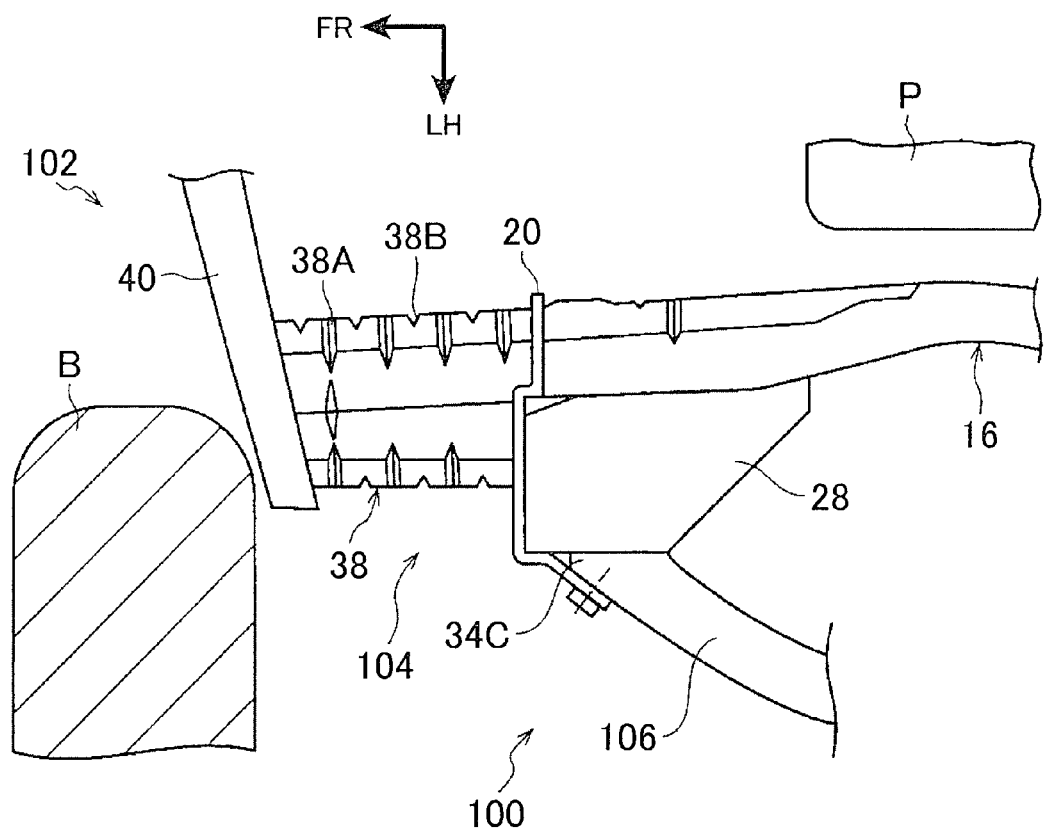
FIG. 8 is a plan view that schematically shows a state immediately before the vehicle, to which a vehicle front structure according to a comparative example is applied, makes the short overlap collision with the barrier and that corresponds to FIG. 6.

FIG. 8 schematically shows a state immediately before a vehicle body front section 104 of a vehicle 102 to which a vehicle front structure 100 according to a comparative example is applied makes the short overlap collision with a barrier B. This vehicle front structure 100 is not provided with a fragile section that clarifies the bending starting point.

Figure 9A:
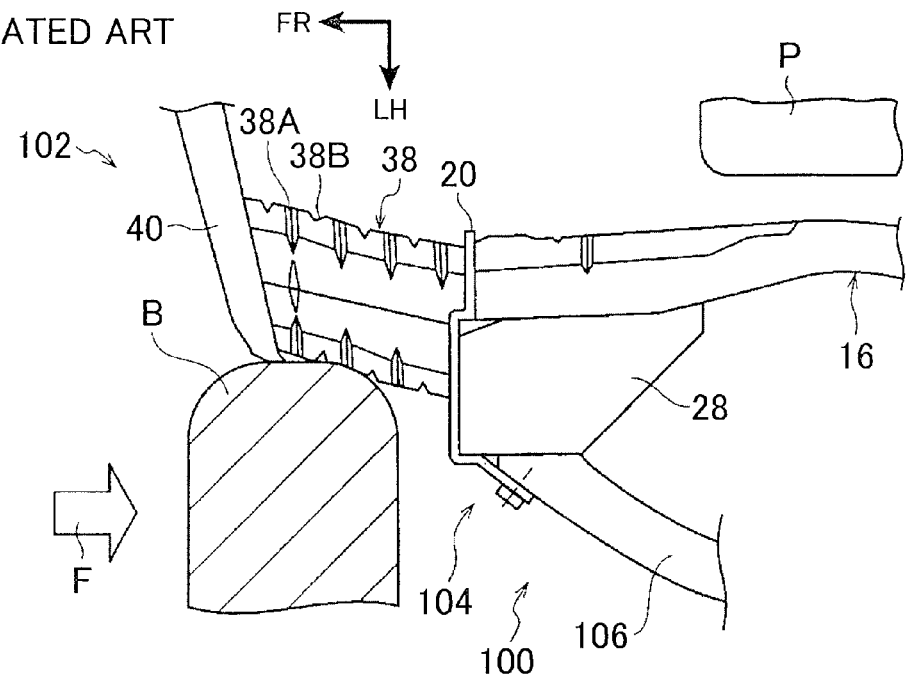
FIG. 9A is a plan view that schematically shows an operation in the vehicle front structure according to the comparative example at a different time point during the short overlap collision.
Figure 9B:
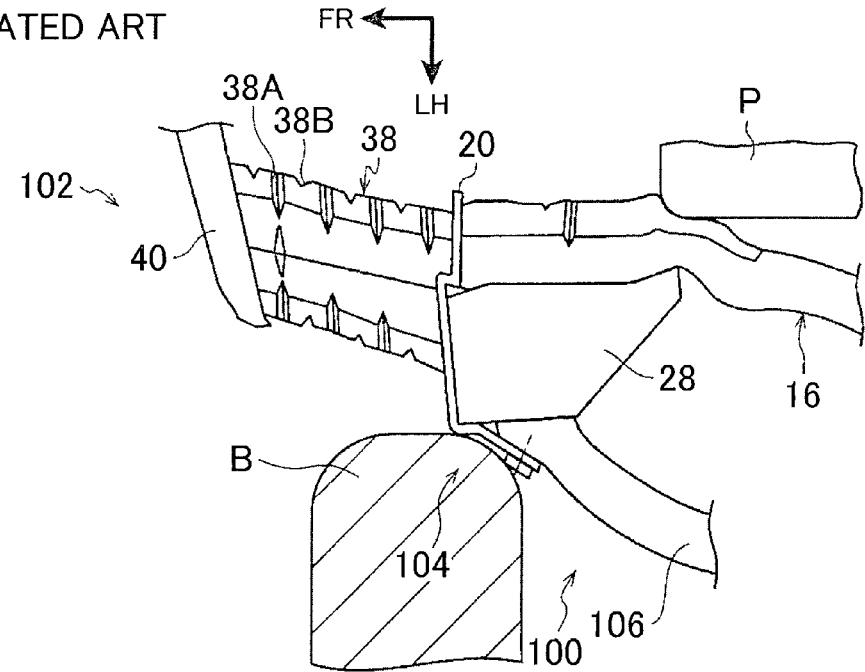
FIG. 9B is a plan view that schematically shows an operation in the vehicle front structure according to the comparative example at another different time point during the short overlap collision.

As shown in FIG. 9A, when the above vehicle 102 makes the short overlap collision with the barrier B as the collision body, a collision load (F) that is directed to the rear is applied from the barrier B to a portion of the bumper reinforcement 40 that is located on the outer side of the front side member 16 in the vehicle width direction. At this time, since the fragile section that serves as the bending starting point is not set in an apron brace 106, the apron brace 106 counteracts to the applied load (F) in the vehicle front-rear direction. Accordingly, the crush box 38 is not subjected to axial compressive plastic deformation as it is originally planned, and the crush box 38 is pushed by the barrier B and tends to collapse to the inner side in the vehicle width direction as a whole. Consequently, the front side member 16 passes through the barrier B. In the end, as shown in FIG. 9B, while an amount of deformation of the front side member 16 to the inner side in the vehicle width direction remains small, the front side member 16 abuts against the power unit P. Thus, not only an energy absorption amount by the front side member 16 is reduced, but the lateral force that presses the power unit P to opposite side of collision direction is also reduced.

Figure 6:
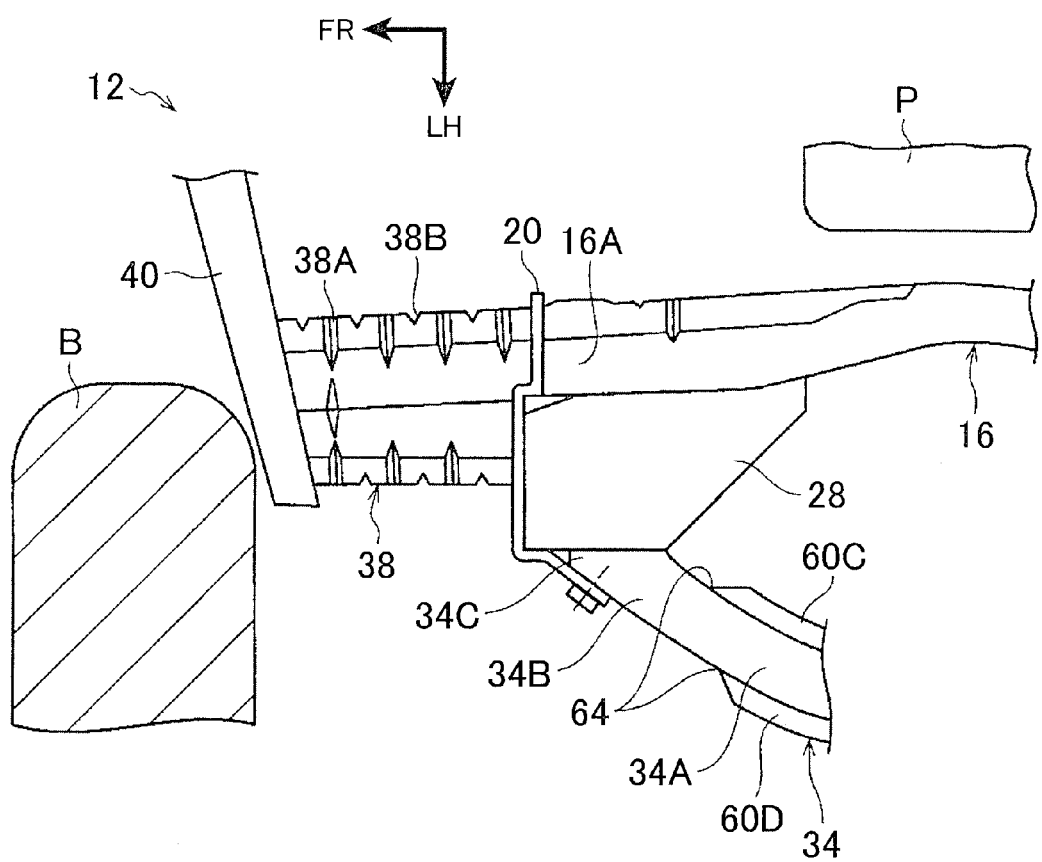
FIG. 6 is a plan view that schematically shows a state immediately before a vehicle, to which the vehicle front structure according to this embodiment is applied, makes a short overlap collision with a barrier.

On the contrary, as shown in FIG. 6, the vehicle front structure 10 according to this embodiment is provided with the fragile section 64 at the boundary between the rear section 34A and the front section 34B of the apron brace 34. Thus, when the vehicle 12 makes the short overlap collision with the barrier B, the vehicle 12 exhibits the following behavior.

First, as shown in FIG. 7A, when the collision load (F) that is directed to the rear is applied from the barrier B to the outer side portion of the bumper reinforcement 40 in the vehicle width direction, a collision load (F0) is transmitted to the crush box 38 by the bumper reinforcement 40. This collision load (F0) is transmitted as a collision load (F1; however, F1<F0) from the crush box 38 to the apron brace 34 through the gusset 28. However, since the fragile section 64 is set in the apron brace 34, the apron brace 34 tends to be bent to the inner side in the vehicle width direction (an arrow P direction side) with the fragile section 64 serving as an starting point. That is, the apron brace 34 does not counteract to the applied load (F) as in the comparative example. Consequently, the crush box 38 is subjected to the axial compressive plastic deformation as it is originally planned, and the apron brace 34 is deformed by being bent to the inner side in the vehicle width direction (the arrow P direction side) with the fragile section 64 serving as the starting point. In addition, due to the deformation behavior of the apron brace 34 at this time, the front side member 16 is pulled to the outer side in the vehicle width direction (an arrow Q direction side) via the gusset 28. Accordingly, a front end 16A of the front side members 16 is directed to the barrier B side (does not pass through the barrier B in a direction to separate from the barrier B), and the collision load (F0) is also transmitted to the front side members 16 via the crush box 38 as a collision load (F2). Due to this collision load (F2) and bending moment M that is generated by bending deformation of the apron brace 34 to the inner side in the vehicle width direction with a rear end of the gusset 28 being the center, the front side member 16 is bent and deformed (bent inwardly) to the inner side in the vehicle width direction.

As shown in FIG. 7B, once the bending deformation of the apron brace 34 is sufficiently progressed, the gusset 28 promotes the inward bending of the front side member 16, and the deformed front side member 16 presses the power unit P to the opposite side of collision direction. Just as described, according to this embodiment, since the amount of deformation of the front side member 16 is increased, the energy absorption amount is also increased compared to that in the comparative example. In addition, a lateral force F' that presses the power unit P to the opposite side of collision direction can also effectively be obtained. As described above, according to the vehicle front structure of this embodiment, the lateral force to the inner side in the vehicle width direction can effectively be generated in the vehicle during the head-on collision such as the short overlap collision.

Also in this embodiment, since the planar direction of the flange is changed for 90 degrees between the rear section 34A and the front section 34B of the apron brace 34. Accordingly, the cross-sectional shape of the apron brace 34 is changed in a portion where the planar direction of the flange is changed, and this portion functions as the fragile section 64. When a method, of constituting the fragile section 64 by changing the planar direction of the flange is adopted, the number of components is not increased. Thus, stabilization of bending mode of the apron upper member (the apron upper member 32 and the apron brace 34) can be realized without increasing a weight and cost.

Supplementary Description of Embodiment

Figure 10:
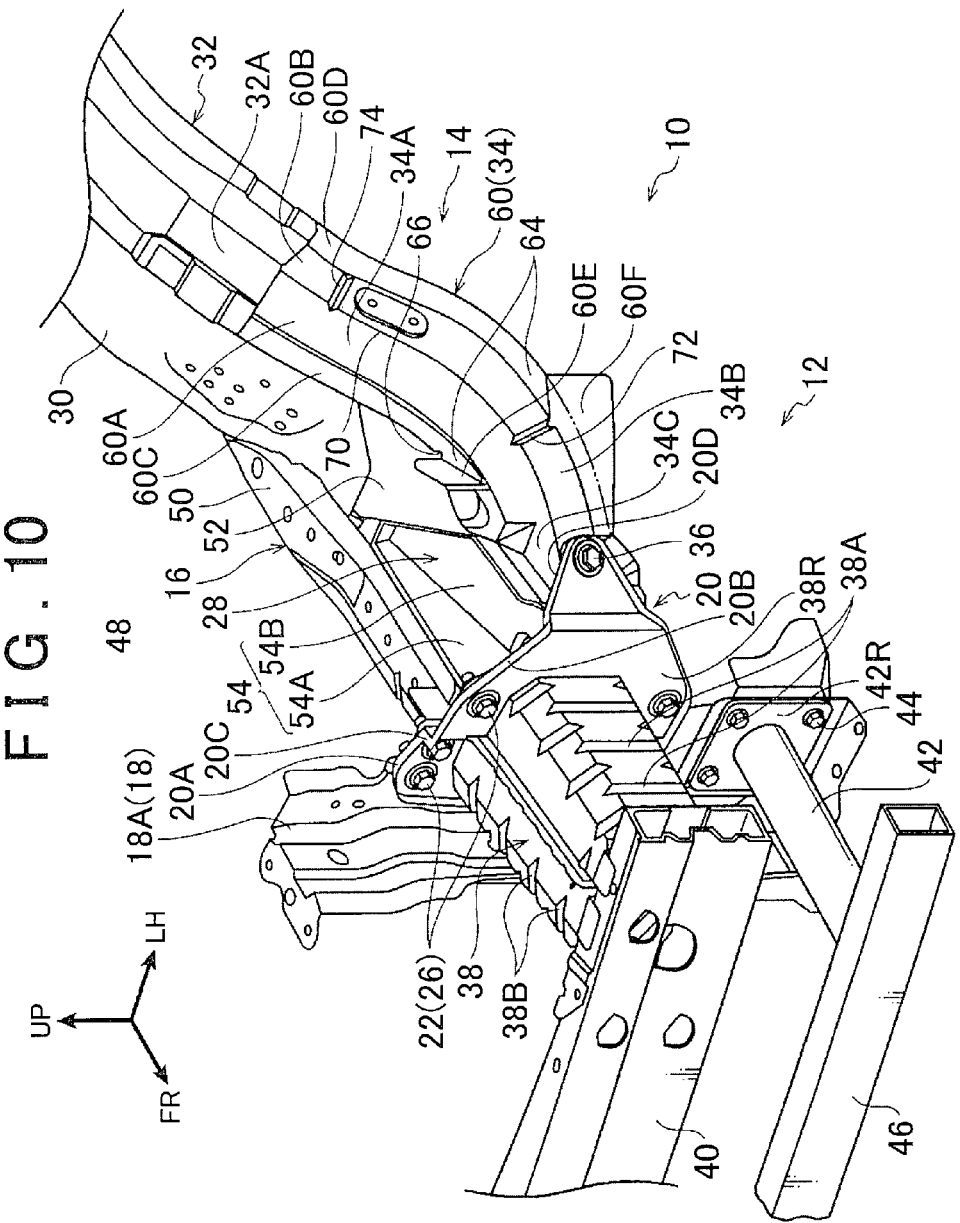
FIG. 10 is a perspective view of a vehicle front structure according to another embodiment that corresponds to FIG. 1.

In this embodiment described above, the fragile section is set by changing the planar direction of the flange section in the surface of the apron brace. However, the configuration is not limited to this. As shown in FIG. 10, one, two, or more of ribs 72, 74 as the fragile sections may be formed in the outer side wall section 60B of the apron brace outer 60, such that ribs 72, 74 cross a ridge line 70. In an example shown in FIG. 10, a pair of the ribs 72, 74 as the fragile sections is set to longitudinally separate from each other. However, the rib 74 on the rear side may not be provided. In addition, in the example shown in FIG. 10, the fragile section 64 is also provided by changing the planar direction of the flange section in the surface of the apron brace. However, only the rib 72 may be provided.

According to the above configuration, stress is likely to be concentrated in each of portions that are formed with the ribs 72, 74 since a cross section of each of the portion that is formed by cutting the apron brace 34 by a plane that is orthogonal to the longitudinal direction of the apron brace 34 is changed (a cross-sectional area of each of the portion is reduced to be smaller than a portion 76 that is not formed with the ribs 72, 74). Thus, each of the portions that are formed with the ribs 72, 74 functions as the fragile section, and the number of components is not increased. Therefore, the stabilization of the bending mode of the apron upper member (the apron upper member 32 and the apron brace 34) can be realized without increasing the weight and cost. Furthermore, since both of the fragile section 64 and the ribs 72, 74 are provided, the apron upper member (the apron upper member 32 and the apron brace 34) is further reliably bent and deformed. Accordingly, the bending mode of the apron upper member (the apron upper member 32 and the apron brace 34) is further stabilized. Consequently, according to this embodiment, the lateral force to the inner side in the vehicle width direction can further efficiently be generated in the vehicle during the head-on collision such as the short overlap collision.

In the example shown in FIG. 10, the concave ribs 72, 74 are formed. However, the configuration in which the cross section of the apron brace outer 60 is changed (preferably changed rapidly) only needs to be adopted. For example, a convex rib may be provided, or one, two, or more openings, thinned sections, or the like may be provided.

In this embodiment, the gussets 28 are disposed to separate from each other in up and down direction. However, the configuration is not limited to this. A U-shaped single gusset whose inner side in the vehicle width direction is opened in a front view of the vehicle may be used, or a cylindrical gusset may be used.

In this embodiment, the example in which the apron brace 34 is integrally connected to the apron upper member 32 is described. However, the configuration is not limited to this. A configuration in which the apron upper member 32 and the apron brace 34 are integrally formed may be adopted.

In this embodiment, the configuration in which the front end 34C of the apron brace 34 is joined to the front end side of the front side members 16 via the gusset 28 is adopted. However, the configuration is not limited to this. A configuration in which the gusset is not provided and in which the front end of the apron brace is directly joined to the front end side of the front side member the outer side in the vehicle width direction may be adopted.

In this embodiment, the example in which the vehicle front structure 10 includes the bracket 20 and the apron brace 34 on both of the sides in the vehicle width direction is described. However, the present invention is not limited to this. For example, a configuration in which the bracket 20 and the apron brace 34 are provided on only the one side in the vehicle width direction may be adopted. In this case, on the side that the bracket 20 and the apron brace 34 are not provided, for example, a component that is mounted in the vehicle may also serve as the bracket 20, and another structure for a measure against the short overlap collision may be adopted.

The invention claimed is:

1. A vehicle front structure comprising:
   a front side member arranged on an outer side in a vehicle width direction with respect to a front part of a vehicle body, the front side member extending along a vehicle front-rear direction;
   an apron upper member arranged on the outer side in the vehicle width direction with respect to the front side member, the apron upper member arranged upward in a vehicle up and down direction with respect to the front side member, the apron upper member extending along the vehicle front-rear direction, the apron upper member including a front end of the apron upper member, the front end of the apron upper member being joined to a front end side of the front side member and the outer side of the front side member in the vehicle width direction either directly or via a gusset; and a fragile section provided on the front end side of the apron upper member, the fragile section serving as a bending starting point, the front end side of the apron upper member being deformed to an inner side in the vehicle width direction at the bending starting point when a collision load is applied.

2. The vehicle front structure according to claim 1, wherein the apron upper member includes a closed cross-section structure and the apron upper member is formed with a pair of flange sections on an outer periphery of the apron upper member, the pair of flange sections are projected in a direction to separate from each other, a planar direction of the flange section is changed in a surface of the flange section, and the fragile section is a portion in which the planar direction of the flange section is changed.

3. The vehicle front structure according to claim 1, wherein the fragile section is a portion in which a cross-sectional shape of the apron upper member is changed, the cross-sectional shape of the apron upper member being indicated by an intersection of a plane and the apron upper member, the plane extending orthogonal to a longitudinal direction of the apron upper member.

4. The vehicle front structure according to claim 1, wherein the fragile section is a portion in which the planar direction of the flange section is changed and the fragile section is a portion that a cross-sectional shape of the apron upper member is changed, and wherein the apron upper member includes the portion in which the planar direction of the flange section is changed, and the portion that the cross-sectional shape is changed.

5. A vehicle front structure comprising:

a front side member arranged on an outer side in a vehicle width direction with respect to a front part of a vehicle body, the front side member extending along a vehicle front-rear direction;

an apron upper member arranged on the outer side in the vehicle width direction with respect to the front side member, the apron upper member arranged upward in a vehicle up and down direction with respect to the front side member, the apron upper member extending along the vehicle front-rear direction, the apron upper member including a front end of the apron upper member, the front end of the apron upper member being joined to a front end side of the front side member and the outer side of the front side member in the vehicle width direction either directly or via a gusset; and a fragile section provided on the front end side of the apron upper member, the fragile section serving as a bending starting point, the front end side of the apron upper member being deformed to an inner side in the vehicle width direction at the bending starting point when a collision load is applied, wherein the apron upper member includes a closed cross-section structure and the apron upper member is formed with a pair of flange sections on an outer periphery of the apron upper member, the pair of flange sections are projected in a direction to separate from each other, a planar direction of the flange section is changed in a surface of the flange section, and the fragile section is the portion in which the planar direction of the flange section is changed.

* * * * *